United States Patent

Den Exter Blokland et al.

Patent Number: 4,695,135
Date of Patent: Sep. 22, 1987

[54] INFORMATION DISPLAY PANEL

[75] Inventors: Hendrikus B. Den Exter Blokland; Petrus J. van Raay, both of Eindhoven, Netherlands

[73] Assignee: U.S. Philips Corp., New York, N.Y.

[21] Appl. No.: 786,775

[22] Filed: Oct. 11, 1985

[30] Foreign Application Priority Data

May 17, 1985 [NL] Netherlands .......................... 8501424

[51] Int. Cl.⁴ .......................... G02B 3/08; G02B 27/22
[52] U.S. Cl. ...................................................... 350/452
[58] Field of Search ........................................... 350/452

[56] References Cited

U.S. PATENT DOCUMENTS 4,309,073  1/1982  Nishimura et al. ................. 350/452
4,309,074  1/1982  Granieri, Jr. ......................... 350/452

FOREIGN PATENT DOCUMENTS 0151901  9/1982  Japan ................................... 350/452

*Primary Examiner*—John K. Corbin
*Assistant Examiner*—Rebecca D. Gass
*Attorney, Agent, or Firm*—F. Brice Faller

[57] ABSTRACT

An image-magnifying element for use in a large-screen panel for assembling constituent pictures displayed on separate picture tubes (2) to form a new unitary picture (30) without discontinuities includes a Fresnel lens (6) whose surface (7, 8) has a curvature which is concentric with that of the faceplate (5) of the picture tube. The Fresnel lens is provided with curved upright side walls (11, 12) of a transparent material, whose outer surfaces (15) are reflecting and whose edges (13, 14) have a curvature corresponding to that of the picture tube.

14 Claims, 5 Drawing Figures

INFORMATION DISPLAY PANEL

BACKGROUND OF THE INVENTION

The invention relates to an optical image-magnifying element having a Fresnel lens, and a plurality of such elements, arranged in rows and columns. The assembly produces a plurality of separate mutually spaced pictures, reproduced by separate picture tubes, to form one unitary picture without discontinuities. The invention also relates to an information-display unit provided with such an image-magnifying element and to an information-display panel comprising a plurality of such units.

The information-display panel, which is also referred to as "video wall" or "super large-screen television", is currently used for displaying information, such as entertainment programs, instructional programs, commercials, still pictures containing messages of miscellaneous kinds, in large species, for example those where exhibitions are held, to a large public. The display panel may have a surface area varying between, for example 2 $m^2$ and 200 $m^2$ and a depth of the order of 0.5-1 m. Such a panel comprises a plurality of conventional picture tubes arranged in rows and columns, the number of picture tubes being dependent on the desired size of the panel picture.

Such a panel may be employed for simultaneously reproducing a plurality of different pictures of equal or different size, which are each reproduced by an equal or a different number of picture tubes, but also for the reproduction of one large picture, in which case each of the picture tubes displays a separate part of the total picture. In such a case, unless further steps are taken, the desired visual impression of a single picture is disturbed by discontinuities because the viewing screens or effective screen surfaces of the picture tubes are spaced from each other. This is because the picture tubes are acommodated in housings having walls of a specific thickness and because the viewing screens cover only part of the face plates of these picture tubes, since the viewing screens have borders.

Another problem associated with the display panel is that the screens of the picture tubes are curved, whereas until now the panel surface which faces the spectators should preferably be flat.

European Patent Application No. 0,074,696 describes several possibilities of reducing the discontinuities in the panel picture and of compensating for the face plate curvature. For example, a multitude of light-conducting fibres may be arranged on the face plate of a picture tube, which fibres fan out towards the audience and thus provide an image-magnifying effect. As a result of this magnification the constituent pictures forming the panel picture adjoin each other without any discontinuities. This solution is particularly suitable for a panel to be viewed from a large distance; in the case of smaller viewing distances the picture elements formed by the individual light-conducting fibres will be visible on the panel. On account of the desired magnification the fibres should have a specific length, so that the fibre array has a considerable thickness and consequently a comparatively large weight. The manufacture of fibre arrays, in particular if the fibres are required to have conical shapes, is rather difficult and therefore expensive when current technologies are used.

As is also stated in European Patent Application No. 0,074,696, the desired magnification of the individual pictures on the picture tubes can also be achieved by means of plane Fresnel lenses, one such lens being arranged in front of every picture tube. However, when a plane Fresnel lens is employed for imaging the picture displayed on a curved screen the picture will become distorted. Moreover, the problem of accurately positioning the Fresnel lens relative to the associated picture tube still has to be solved. In addition, the transitions between the individual Fresnel lenses are still visible in the panel picture.

SUMMARY OF THE INVENTION

In an image-magnifying element which is eminently suitable for use in a large-screen display panel the Fresnel lens exhibits a curvature corresponding to the curvature of the face plate of the picture tube in two mutually perpendicular directions. By adapting the curvatures of the face plate of a picture tube and the Fresnel lens to each other it is achieved that the distance between the face plate and the Fresnel lens is constant over the entire area of the image, so that the image magnification over this area is also constant and consequently the distortion is minimal.

The problem of aberrations and distortions arising when a plane Fresnel lens is arranged in front of a curved viewing screen has been pointed out in U.S. Pat. No. 3,909,525, where it is proposed to construct the plane Fresnel lens in such a way that it functions as an aspherical lens. However, such a lens exhibits an intricate ring structure which is difficult to manufacture. The advantage of the image-magnifying element in accordance with the invention is that it comprises a conventional Fresnel lens, which is already manufactured on a large scale, but which is only curved in a specific manner.

In order to enable the Fresnel lens to be arranged at the correct distance from the face plate of the picture tube during assembly, in order to ensure a correct image magnification, and in order to ensure that the entire surface of the Fresnel lens facing the viewer is filled only with the image of the associated picture tube, the Fresnel lens is provided with upright side walls at its edges. The presence of the upright side walls ensures that the transitions between the Fresnel lenses are not visible in the panel picture and the height of the upright side walls defines the distance between the Fresnel lens and the face place of the picture tube.

In order to avoid discontinuities in the panel picture caused by the side walls of the adjoining Fresnel lenses, the side walls are made of a transparent material and the outer surfaces of said side walls are reflecting. As a result of this, the upright side walls contribute to the image formation. That part of the light from a picture tube which is incident on the upright side walls of the associated image-magnifying element is now reflected towards the viewers by the outer surfaces of these upright side walls.

Preferably, those edges of the side walls which are remote from the Fresnel lens exhibit a curvature corresponding to the curvature of the face plate of the picture tube for which said element is intended. This enables the Fresnel lens to be aligned automatically relative to the face plate during assembly.

In order to preclude the formation of a Moiré pattern in the panel picture as a result of interference of the line pattern on the viewing screen with the annular structure of the Fresnel lens, the concave inner side of the Fresnel lens functions as a diffusor.

The invention is also embodied in information-display unit comprising a picture tube and an image-magnifying element which is secured thereto. This unit is characterized in that the curved surface of the Fresnel lens is concentric with the face plate of the picture tube.

This unit may be characterized further in that the focal length f of the Fresnel lens, the magnification $N=M/M'$ of this lens and the distance a between the face plate of the picture tube and the Fresnel lens are related as follows:

$$a=f(1-M'/M)$$

where M' is the dimension of the face-plate in a specific direction and M the dimension of the Fresnel lens in the same direction. This step ensures that the faceplate is imaged with the correct magnification and without distortion at the correct location.

The image-magnifying element may be secured to the picture tube by resilient means which are attached to the side walls of the image-magnifying element and to the picture tube. This ensures a correct alignment of the picture tube and the image-magnifying element relative to each other because the spring forces are equal to one another.

The invention is also embodied in an information-display panel comprising a plurality of display units which each comprise an image-magnifying element and which are arranged in rows and columns. The use of the invention ensures that this panel displays a picture without any discontinuities.

DETAILED DESCRIPTION OF THE INVENTION

Figure 1:
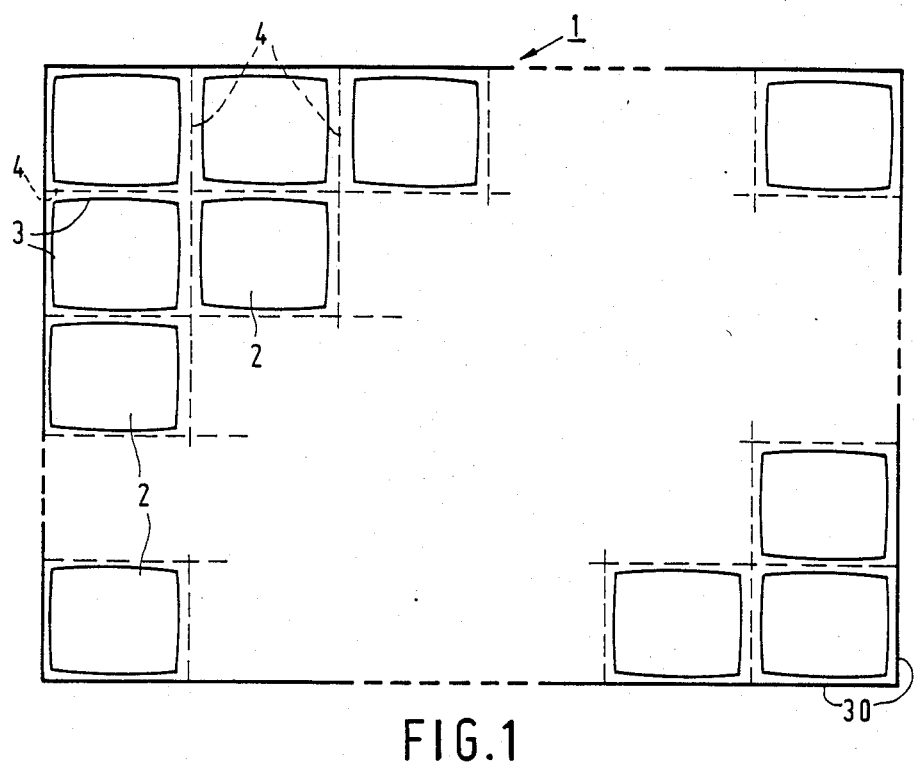
FIG. 1 is a front view of a display panel.

The display panel 1 shown in FIG. 1 comprises a plurality of picture tubes 2 arranged in a rectangular matrix of rows and columns. The number of picture tubes depends on the desired size of the panel picture. The picture tubes are conventional tubes, for example tubes having a screen diagonal of 66 cm, and are arranged as close as possible against one another. The edges of the picture tube screens or faceplates are shown in solid lines 3. The viewing screens or the effective screen surfaces of the picture tubes are not shown for the sake of simplicity, but cover an area smaller than the area bounded by the lines 3. In order to magnify the pictures on the individual picture tubes to such an extent that a contiguous picture without discontinuities is formed on the front surface of the panel 1, a Fresnel lens is arranged in front of each picture tube. The surface area of this lens is represented by the broken lines 4, which lines also represent the boundaries of the images of the faceplates of the picture tubes. These magnified images adjoin one another, so that an observer at a location before the plane of drawing of FIG. 1 is given the impression of one large picture, bounded by the solid lines 30 in FIG. 1.

Figure 2:
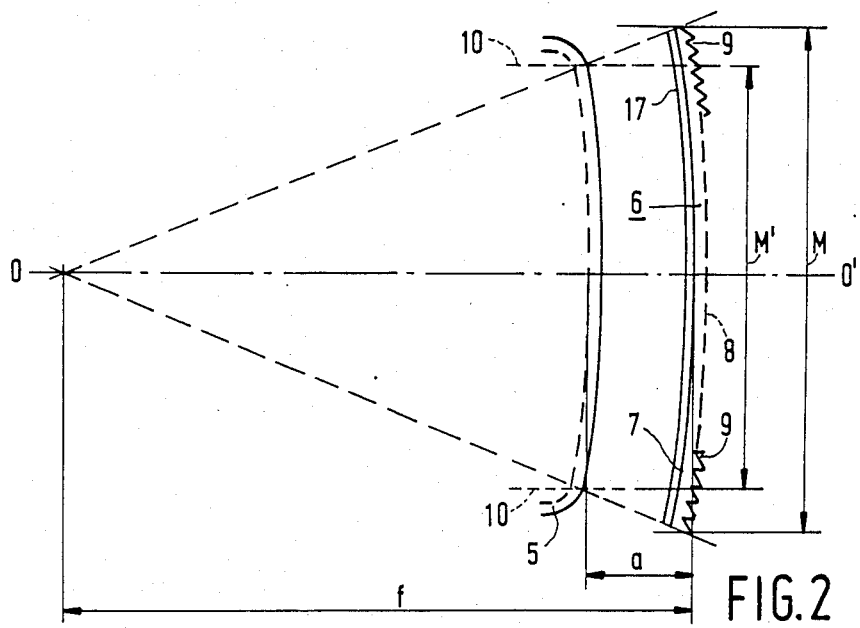
FIG. 2 illustrates the magnification by the Fresnel lens.

In FIG. 2 the Fresnel lens 6 and the faceplate 5 of a picture tube are shown in a cross-sectional view. The central axis of the faceplate coincides with the optical axis 00' of the Fresnel lens. This lens has curved surfaces 7 and 8 which are concentric with the surface of the faceplate. The distance a between the Fresnel lens and the faceplate is constant over the entire surface area of the lens, so that this lens images every point of the viewing screen, bounded by the points 10, with a constant magnification as a corresponding image point, and the picture is not distorted.

The Fresnel lens includes a plastic substrate plate the surface 8 facing the viewer having a multitude of annular facets 9, some of which are shown in FIG. 2. These facets are refractive elements by means of which the radiation traversing them is refracted through specific angles. For further details on the operation of this type of lens reference is made to the standard literature on optics.

The Fresnel lens magnifies the image within the limits 10 by a factor $N=M/M'$. This magnification depends on the focal length of the Fresnel lens and the distance a between the lens and the faceplate, in conformity with $$N=f/(f-a)$$

from which it follows that the distance a should be:

$$a=f(a-M'/M).$$

Figure 3:
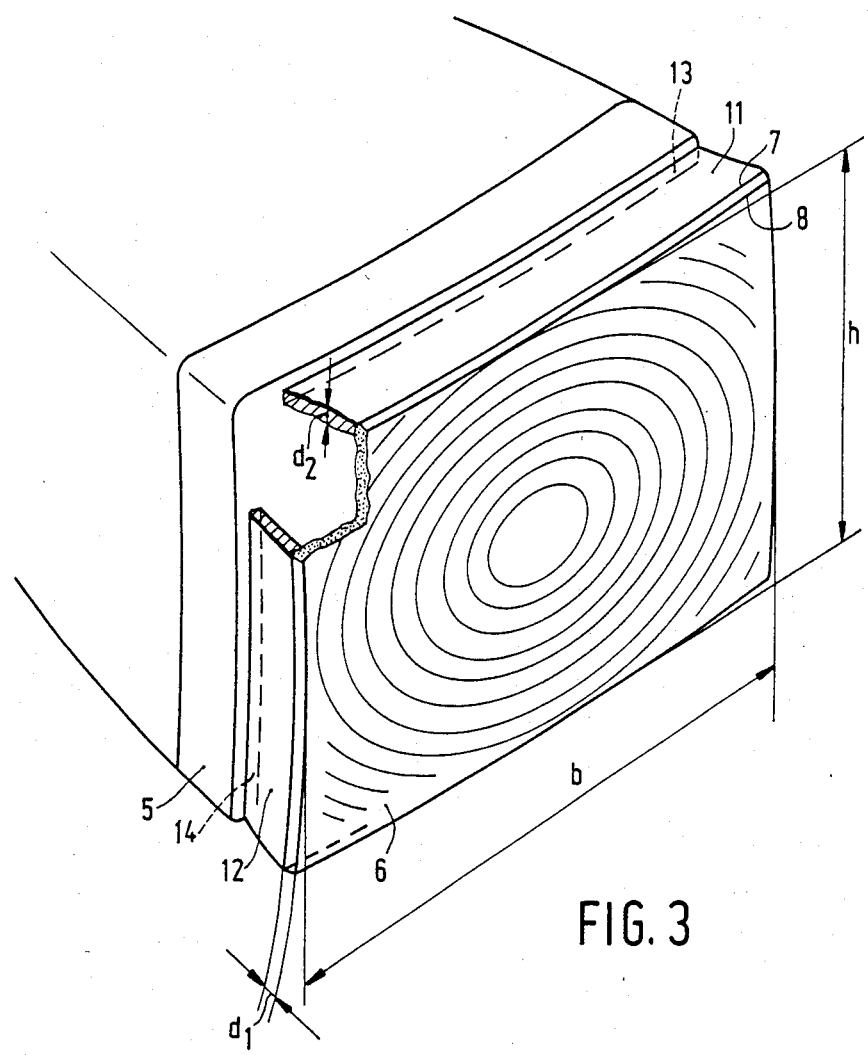
FIG. 3 is a perspective view showing the Fresnel lens and the faceplate of the picture tube.

In order to ensure that this distance is maintained over the entire surface area of the Fresnel lens 6, the Fresnel lens is provided with upright side walls 11 and 12, as shown in FIG. 3. The side walls 11 and 12 extend at an acute angle to the surface of the Fresnel lens, so that the area bounded by the edges 13 and 14 of the side walls is smaller than the area of the Fresnel lens. Further, the side walls 11 and 12 are curved in conformity with the faceplate. In this way it is achieved that the faceplate image formed by the Fresnel lens is a rectangle when projected in a plane.

The edges 13 and 14 of the side walls 11 and 12 have curvatures corresponding to those of the faceplate 5 and hence also correspond to those of the surfaces 7 and 8 of the Fresnel lens. This ensures that when the side walls of the Fresnel lens are pressed against the faceplate the lens and the plate are automatically aligned correctly relative to one another.

Care must be taken that through the side walls no light from a picture tube can reach the image of the adjacent picture tube formed by the Fresnel lens, because this may give rise to blurring of the edge portions of the constituent pictures which together constitute the panel picture. It may be considered to make the side walls of a light-absorbing material. However, the constituent pictures will then be surrounded by dark bands and the edge portions of the constituent pictures will exhibit a reduced brightness. A better solution with respect to the loss of light is to make the side walls internally reflecting, so that all the light issuing from a picture tube contributes to the image formed of the relevant picture tube. This solution has the disadvantage that for each side wall a dark band is formed in the panel picture, which accentuates the separation between the constituent pictures and which partly cancels the effect of the invention.

Figure 4:
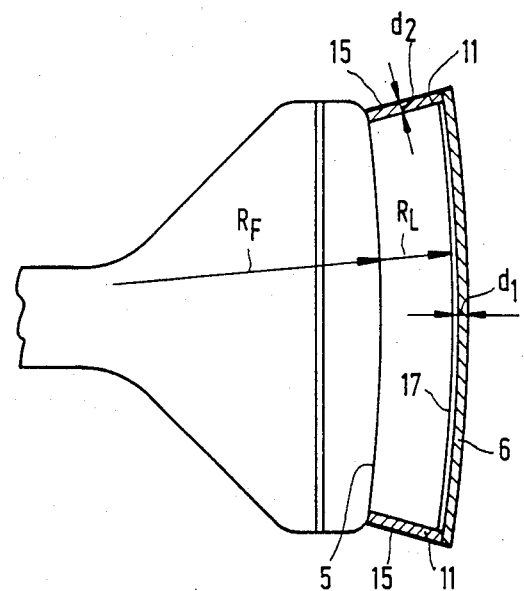
FIG. 4 is a cross-sectional view of the lens and faceplate.

In accordance with the present invention the side walls 11 are made of a transparent material and are externally reflecting, as is shown in FIG. 4. The faceplate 5 and the Fresnel lens 6 with its upright side walls the outer surfaces of side walls 11 are provided with a reflective coating 15. The side walls now function as light guides, which guide the light issuing from the edge portions of the faceplate to the Fresnel lens.

The side walls 11 and 12 may be secured to the Fresnel lens by means of a transparent adhesive whose refractive index approximates as closely as possible to those of the materials of the side walls and of the Fresnel lens, so that reflections from the transitions between the side walls and the Fresnel lens are minimized.

In a practical embodiment of the image-magnifying element the side walls are made of polymethyl methacrylate (PPMA). The thickness $d_1$ of the lens is approximately 3 mm and the thickness $d_2$ of the side walls is approximately 5 mm. If the Fresnel lens is employed for magnifying the picture on a picture tube having a diagonal of 660 mm, the surface 8 has a height h of approximately 450 mm and a width b of approximately 572 mm. The radius of curvature $R_L$ of the lens in both directions is approximately 1080 mm. The radius of curvature $R_F$ of the faceplate is approximately 1000 mm and the distance a between the faceplate and the Fresnel lens is approximately 80 mm. The picture on the faceplate has a width of approximately 905 mm and a height of approximately 380 mm.

The use of Fresnel lenses in an information-display panel has the additional advantage that the picture content of the original picture is reproduced to an optimum extent. If a picture is divided into a plurality of constituent pictures which are each reproduced by a separate picture tube, the ends of corresponding details reproduced on adjacent screens do not adjoin each other. This may be remedied by enlarging the constituent pictures formed on the picture tubes by increasing the maximum deflection of the electron beam in each picture tube. However, in that case a part of the picture content will disappear in the edges of the faceplates outside the viewing areas and this part cannot be reproduced by the panel. However, when Fresnel lenses are employed the viewing area and the magnification of the Fresnel lens can be adapted to each other in such a way that in principle the entire picture content is displayed.

Interference of the line pattern on the faceplate with the annular pattern of the Fresnel lens may give rise to Moiré rings in the panel picture. In order to preclude this, steps are taken to ensure that the surface 7 of the Fresnel lens which faces the picture tube functions as a diffusor. There are several possibilities of giving the inner surface 7 light-diffusing properties. Preferably, a coating of a transparent substance which cures before it spreads is applied to said surface by fine atomization.

There are several methods of securing the image-magnifying element to the picture tube. However, an optimum fixation is obtained by resilient means which draw the element with equal force towards the faceplate at four different points so that, inter alia as a result of the corresponding shapes of the Fresnel lens and the faceplate, the plate and the lens are aligned automatically.

Figure 5:
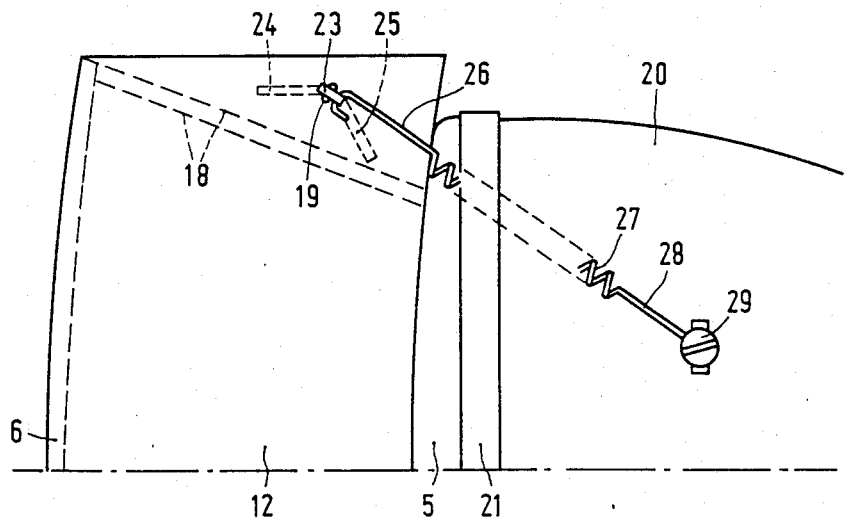
FIG. 5 shows how the Fresnel lens is secured to the picture tube by means of tension springs.

FIG. 5 illustrates a preferred fixing method employing tension springs.

A rim band 21 is located where the faceplate 5 is attached to the cone 20. The Fresnel lens 6 is fixed to side wall 12 which abuts against the faceplate. The broken lines 18 represent one of the other side walls 11. The side wall 12 is formed with a hole 19 in which a split pin 23 is fitted. The numerals 24 and 25 denote the bent portions of this pin. One end 26 of a tension spring 27 is hooked behind the split pin. The other end 28 of this spring is secured to the picture tube by means of a screw 29. For each side wall 12 two sets of the fixing means shown in FIG. 5 are provided, so that the Fresnel lens is drawn against the faceplate by means of four tension springs.

What is claimed is:

1. An information display panel comprising a plurality of information display units arranged in a rectangular matrix of rows and columns, each display unit comprising a picture tube having a faceplate with a curved surface and an image magnifying element secured thereto, said image magnifying element comprising a Fresnel lens spaced from said face plate, each said Fresnel lens exhibiting in two perpendicular directions a curvature which corresponds to the curvature of the respective faceplate, each said Fresnel lens being concentric with the surface of the respective face plate, said display unit being arranged so that respective Fresnel lenses form a unitary picture without discontinuities.

2. An information display panel as in claim 1 wherein for each display unit the focal length f of the Fresnel lens, the magnification $N=M/M'$ of this lens and the distance a between the faceplate of the picture tube and the Fresnel lens are related as follows:

$$a = f(1 - M'/M)$$

where M' is the dimension of the faceplate in a specific direction and M is the dimension of the Fresnel lens in the same direction.

3. An information display panel as in claim 1 wherein the edges of each Fresnel lens are provided with upright sidewalls.

4. An information display panel as in claim 3 wherein the image magnifying element is secured to the picture tube by resilient means which are attached to the sidewalls of the image magnifying element and to the picture tube.

5. An information display panel as in claim 3 wherein the sidewalls are made of a transparent material and the outer surfaces of said sidewalls are reflective.

6. An information display panel as in claim 3 wherein said sidewalls have edges remote from said Fresnel lens, said edges having curvature which corresponds to the curvature of the faceplate of the respective picture tube.

7. An information display panel as in claim 1 wherein each Fresnel lens has a concave inner surface which functions as a diffuser.

8. An information display panel as in claim 7 wherein said concave inner surface is covered with a discontinuous transparent coating.

9. An information display unit comprising a picture tube having a faceplate with a curved surface and an image magnifying element secured thereto, said image magnifying element comprising a Fresnel lens spaced from said face plate, said Fresnel lens exhibiting in two perpendicular directions a curvature which corresponds to the curvature of the faceplate, said Fresnel lens being concentric with the surface of the faceplate, said magnifying element further comprising upright sidewalls extending from edges of said Fresnel lens to said faceplate, said sidewalls being made of transparent material, the outer surfaces of said sidewalls being reflective.

10. An information display unit as in claim 9 wherein the focal length f of the Fresnel lens, the magnification $N=M/M'$ of this lens and the distance a between the faceplate of the picture tube and the Fresnel lens are related as follows:

$$a = f(1 - M'/M)$$

where M' is the dimension of the faceplate in a specific direction and M is the dimension of the Fresnel lens in the same direction.

11. An information display unit as in claim 9 wherein the image magnifying element is secured to the picture tube by resilient means which are attached to the sidewalls of the image magnifying element and to the picture tube.

12. An information display unit as in claim 9 wherein the edges of said sidewalls remote from said Fresnel lens have a curvature which corresponds to the curvature of the faceplate.

13. An information display unit as in claim 9 wherein said Fresnel lens has a concave inner surface which functions as a diffuser.

14. An information display unit as in claim 13 wherein said concave inner surface is covered with a discontinuous transparent coating.

* * * * *